United States Patent [19]
Hoag

[11] Patent Number: 5,155,327
[45] Date of Patent: Oct. 13, 1992

[54] LASER POINTING SYSTEM

[75] Inventor: David G. Hoag, Medway, Mass.

[73] Assignee: Charles Stark Drapes Laboratory, Cambridge, Mass.

[21] Appl. No.: 486,954

[22] Filed: Mar. 1, 1990

[51] Int. Cl.[5] .............................................. B23K 26/02
[52] U.S. Cl. ............................ 219/121.78; 219/121.74
[58] Field of Search ............ 219/121.6, 121.85, 121.78, 219/121.79, 121.76

[56] References Cited

U.S. PATENT DOCUMENTS

| | | | |
|---|---|---|---|
| 3,658,427 | 4/1972 | DeCou | 356/156 |
| 3,732,424 | 5/1973 | Wojtulewicz | 250/203 |
| 4,270,044 | 5/1981 | Elwell, Jr. | 250/201 |

Primary Examiner—C. L. Albritton

[57] ABSTRACT

A laser pointing system directs a laser beam at one face of a steering mirror to produce a steered reflected beam. A highly attenuated portion of the laser beam passes through the mirror leaving at a second side, which side also reflects a stellar field. A star of the stellar field and the attenuated beam are both imaged on a star tracker. The mirror is moved so the two images coincide, thus aligning the steered beam parallel to the direction of the star. A gyro package detects changes in the system orientation to update the mirror reference position, and a processor provides command coordinates to move the beam from the stellar coordinates and cause it to point in a selected target direction.

6 Claims, 6 Drawing Sheets

LASER POINTING SYSTEM

BACKGROUND OF THE INVENTION

The present invention relates to systems for aiming a beam of light from a moving vehicle, such as a space vehicle, in a desired direction which is specified by celestial or geographic coordinates. In general, a highly collimated light beam such as a laser beam is directed by a pointing mirror which is mounted in a known orientation on the spacecraft. One method of aiming such a laser is to use the attitude control system of the craft to re-orient the craft such that a fixedly mounted pointing mirror is directed in the desired direction. The spacecraft orientation is established by an independent sensing system. Another method of aiming, which also relies on the spacecraft attitude sensor, is to mount the pointing mirrors in a steering assembly, and move the assembly to point in the desired direction based on the known spacecraft attitude, the fixed mounting Position of the mirror, and the initial mirror orientation with respect to the fixed mount.

A number of pointing inaccuracies may arise in such systems due to errors in the spacecraft attitude determination which may result, e.g., from limitations of the horizon sensor, sun seeker or other sensors employed in that determination. Further errors may result from the pertubations in mounting alignment of the attitude sensors with respect to the spacecraft, of the laser cavity mirrors with respect to the spacecraft, and of the base of the pointing mirror with respect to the spacecraft. The pointing accuracy is also affected by the zero adjustment and stability of the mirror angle transducers.

Given the extreme thermal gradients possible in a space environment, the cumulative effect of these different errors in sensing or alignment may be significant. Accordingly, it is desirable to provide a laser pointing system of enhanced accuracy.

SUMMARY OF THE INVENTION

The present invention eliminates errors due to the physical alignment of the elements of the pointing system with respect to the spacecraft by providing a single mirror element which simultaneously points the laser and aligns it with respect to a celestial object, directly providing a stellar reference direction for the mirror-laser system. The mirror element is then redirected to the desired coordinates. An inertial orientation memory tied to the stellar reference provides corrections for intervening changes in the mirror assembly position.

In a preferred embodiment, the mirror element is a thin planar mirror with parallel first and second surfaces, which is mounted in a gimbal assembly. A reference star field is directed at the first side of the mirror, and the laser beam is directed at the other side. Each side is a highly reflective but partially transmissive face, so that a highly attenuated portion of the laser beam is transmitted through the mirror, exiting the first side. The attenuated beam is imaged in the same plane as the reference star field. When the laser beam image is aligned on the reference star, the principal laser beam reflected from the second side is necessarily precisely parallel to the direction of that star. In this manner, the pointing mirror itself is brought into direct alignment with respect to a stellar reference.

Both the pointing mirror and the stellar reference unit are mounted on a common, dimensionally stable base. A gyro reference Package, which is preferably mounted on the same base, is tied to the stellar reference developed by aligning the beam on the reference star, and the gyro thereafter detects and accumulates angular changes to develop a correction for intervening motion of the pointing assembly.

In further embodiments, a separate small steering mirror is located between the laser cavity and the pointing mirror. Accelerometers mounted on the laser cavity mirrors detect linear or angular accelerations of the cavity, and a control unit converts the corresponding laser beam influence functions to control signals which move the small steering mirror to effect higher frequency corrections lying outside the bandwidth of the stellar alignment system and pointing mirror.

BRIEF DESCRIPTION OF DRAWINGS

These are other features of the invention will be understood from the following description taken together with illustrative drawings, wherein.

DETAILED DESCRIPTION

Figure 1:
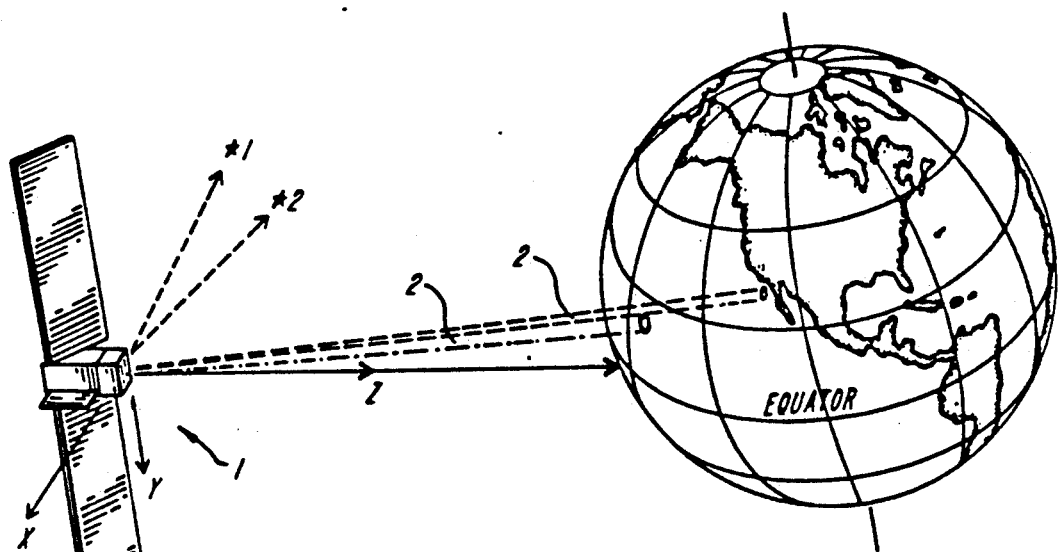
FIG. 1 shows a satellite with an earth-directed laser pointing system.

FIG. 1 shows in broad generality a space satellite 1 which directs a highly collimated beam of laser light 2 toward a defined geographic locus. The beam is modulated in a known manner to carry information, and thus constitutes a highly directional communications channel. For example, a satellite at a height of twenty thousand kilometers emitting a beam that has a divergence of under twenty microradians will direct its energy to a "spot" at the earth's surface of several hundred meters radius. For a satellite in a lower orbit aiming a less divergent beam, the spot size could be smaller than a few tens of meters. For such a beamwidth, variations in alignment or drift of the various mounting, sensing, and aiming components of the laser pointing system located on the satellite become great sources of inaccuracy.

Figure 2:
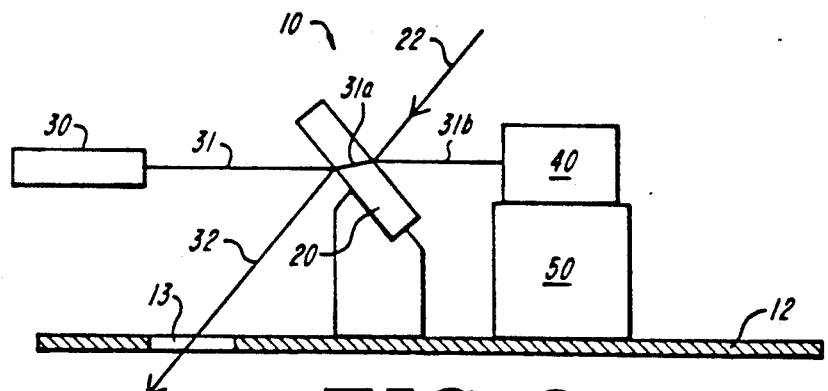
FIG. 2 shows details of a pointing system of the present invention.

FIG. 2 illustrates a laser pointing system 10 in accordance with the present invention which removes or reduces pointing system errors. A unitary base structure 12 carries a pointing mirror 20, star tracker 40, and a gyro reference package 50.

The elements are arranged such that the Pointing mirror 20 receives a laser beam 31 from a laser 30 and directs it as a reflected beam 32 through a window 13 which opens in the desired direction, e.g., spanning an angular sector of ten to thirty degrees toward the earth. Mirror 20 simultaneously receives stellar light 22 from a star field along a different direction and reflects it toward the star tracker so that a reference star is imaged therein. The star tracker includes an infinity-focused telescope with a focal plane sensor array at its focus onto which the incoming stellar light 22 is imaged.

The collimated laser beam 31 directed at the first face of mirror 20 is split by mirror 20 into the reflected beam 32 and a transmitted beam 31a, 31b which is attenuated as it passes each reflective mirror surface so that the beam power of transmitted beam 31b is comparable to the intensity of the stellar image. Each mirror surface has a reflectivity preferably above 99.99 percent; the mirror blank itself may be of a highly absorbent material to further attenuate the transmitted laser beam. The attenuated laser beam 31b is then imaged by the star tracker in the same plane as the stellar field.

Because laser beam 31 is collimated and the opposite faces of mirror 20 are parallel, motion of the mirror 20 has no effect on the position of the point image of the beam formed on the tracker's sensor array, although the size of the beam image varies with the degree of laser collimation. Thus, as the mirror 20 moves, the image of the star field reflected from the upper side of the mirror shifts with respect to the fixed laser spot.

Figure 4A:
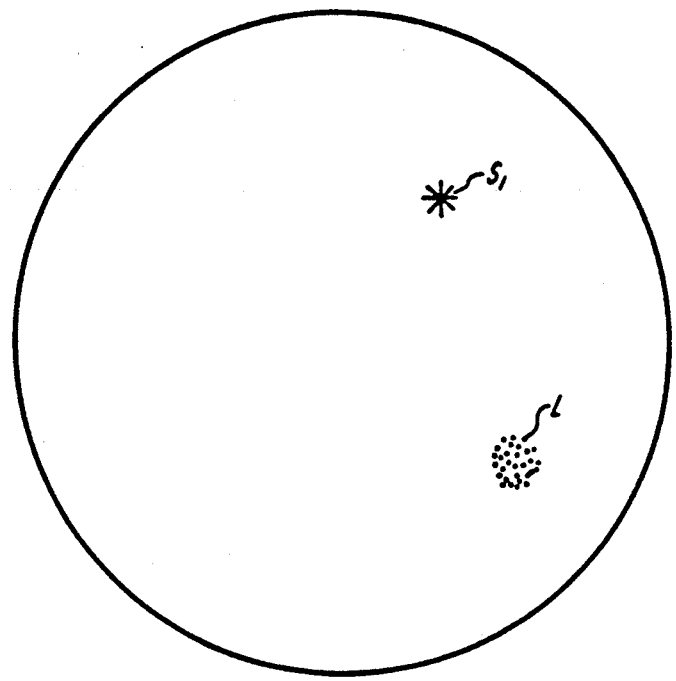
FIGS. 4a, 4b illustrate alignment steps Performed in accordance with the invention.
Figure 4B:
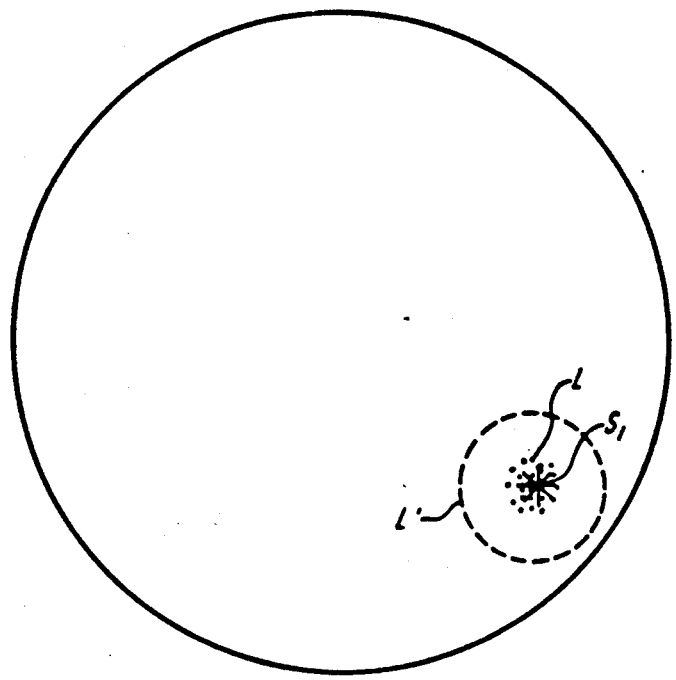

FIG. 4a illustrates the focal array 41 of the star tracker 40. The fixed laser spot L and the image $S_1$ of a first identified star are shown initially at different positions. Movement of mirror 20 shifts the pointing direction of the stellar view so that by moving mirror 20, $S_1$ can be brought into alignment with laser spot L as shown in FIG. 4b. Moving the mirror in this manner changes the direction in which the reflected laser beam 32 is directed.

According to a principal aspect of the present invention, the mirror 20 directly aligns the reflected laser beam 32 with respect to a star reference by so aligning the images $S_1$ and L. The larger spot image L' shown in phantom in FIG. 4b indicates the larger laser beam image which would be formed by a less-well collimated beam. In this case, the system of the present invention operated by aligning the star image $S_1$ centrally in the larger spot L'. When the images are aligned in this manner, the reflected laser beam 32 is precisely parallel to the stellar reference direction of star $S_1$ so that precise pointing is achieved independently of laser cavity alignment, mirror base position or alignment and other variations in the physical components.

Figure 3:
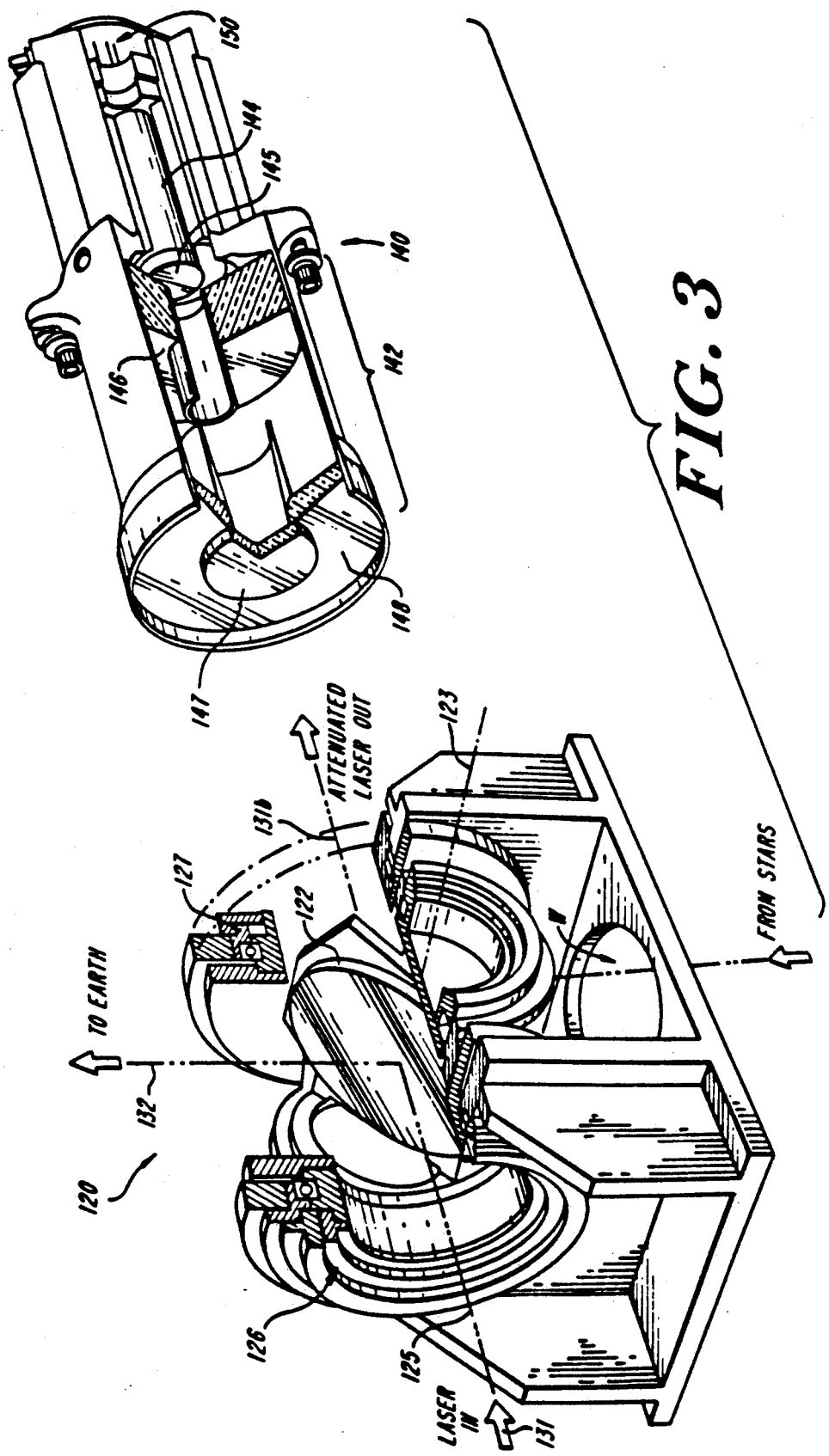
FIG. 3 illustrates a two axis laser steering mirror and star tracker used in a preferred embodiment of the system of FIG. 2.

FIG. 3 illustrates a representative pointing mirror assembly 120 and star tracking assembly 140 useful in the practice of the invention. Each assembly is shown in a partial cut away view to elucidate the functioning thereof. Pointing mirror assembly 120 is a two axis servo controlled mirror assembly, in which a two-sided mirror 122 is carried by an assembly which rotates about an inner trunion axis 123 and about an outer rotary axis 125. The mechanism for rotating about each axis includes a direct drive brushless torgue motor, the outer drive torque motor being indicated by 126, and a corresponding resolver on each axis, of which outer resolver 127 is shown. Each resolver indicates the angular position about one axis of the rotary mirror carriage.

An expanded high power signaling laser input beam 131 is directed along axis 125, as is the attenuated sampled laser steering control output beam 131b. The reflected beam 132 corresponds to beam 32 of FIG. 2, and passes through an opening or window along its intended target direction to a reception site. A second window or opening W in the steering assembly allows mirror 122 to receive and reflect a stellar field from the other side of the mirror for imaging along the axis 125, which is substantially aligned with the axis of a stellar alignment sensor, star tracker 140.

Tracker 140 is essentially a fixedly mounted telescope 142 of Schmidt-Cassegrain design having a vidicon tube 144 mounted with its face Plate 145 at the telescope focal plane. A primary mirror 146, and secondary diverging mirror 147, together with corrector plate 148, correct and focus both the reflected star field and the attenuated laser output 131b onto faceplate 145. The vidicon provides a video output along its scanning signal output lines 150, which passes to a computerized graphic analysis module of a conventional type that monitors the stellar image position on faceplate 145.

Both the mirror assembly 120 and the stellar alignment sensor 140 are fixedly mounted on a common pointing system base (12, FIG. 2) with a three degree of freedom gyro reference package. In operation the mirror 122, is moved to superimpose a first star image $S_1$ on the laser spot, the mirror angles are read from the resolvers to provide an initial mirror position reference, and the gyro reference package is initialized for two components to provide an indication of the orientation of the pointing system base with respect to the first star $S_1$. These steps are then repeated for a second, different star $S_2$. Thereafter the gyro reference package detects changes in orientation of the pointing system base from these reference orientations, and provides corresponding corrections to the mirror pointing angles.

The control system for aiming the mirror 122 receives the base orientation in a celestial reference frame, and at any given time, the coordinates are readily converted to geographic coordinates. Given the satellite position, the mirror angles required to point the laser beam to a desired geographic location are calculated. Thus, following the initial alignment of the beam on stars $S_1$ and $S_2$, the mirror is commanded to accurately Point at any geographic location. As the spacecraft moves, the orientation of the pointing mirror is changed in accordance with changes in spacecraft position and the intervening changes in orientation of the pointing system base as sensed by the gyro reference package.

Further, in the event that the laser input beam direction wanders with respect to the pointing system base, for example, due to structural warping or slipping of the laser structure, this causes motion of the laser spot on the focal plane of the star tracker, which is readily detected in the video output and corrected by small, open loop re-aiming of the mirror. Errors introduced by longer term drift of the gyro reference package are periodically eliminated by re-initializing the package on a new pair of star readings.

Figure 5:
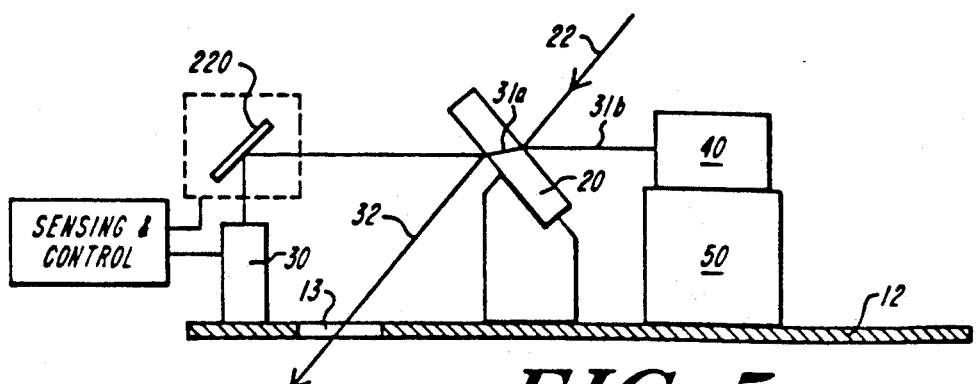
FIG. 5 illustrates another embodiment of a pointing system in accordance with the present invention.

FIG. 5 illustrates a further embodiment 200 of the invention, which differs from the embodiment of FIG. 2 in having a second mirror 220 which is a small high speed steering mirror interposed between the laser and the pointing mirror. In this embodiment of the invention, motions of the laser are detected by angular or linear accelerometers mounted on the laser cavity mirrors, and corresponding control signals are applied to move mirror 220 and perform small amplitude, high speed corrections of the laser beam. This additional correction mirror may compensate for vibration of the laser system, and for other perturbations of the beam direction which lie outside the bandwidth of the star tracker control loop.

Figure 6B:
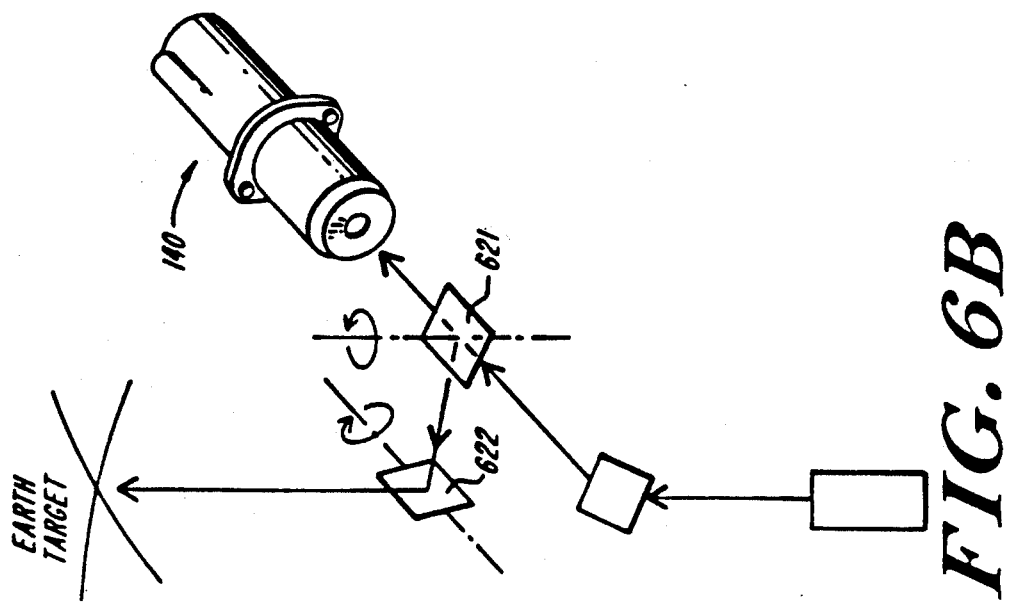
FIGS. 6a and 6b illustrate an embodiment of the invention having two single-axis steering mirrors.
Figure 6A:
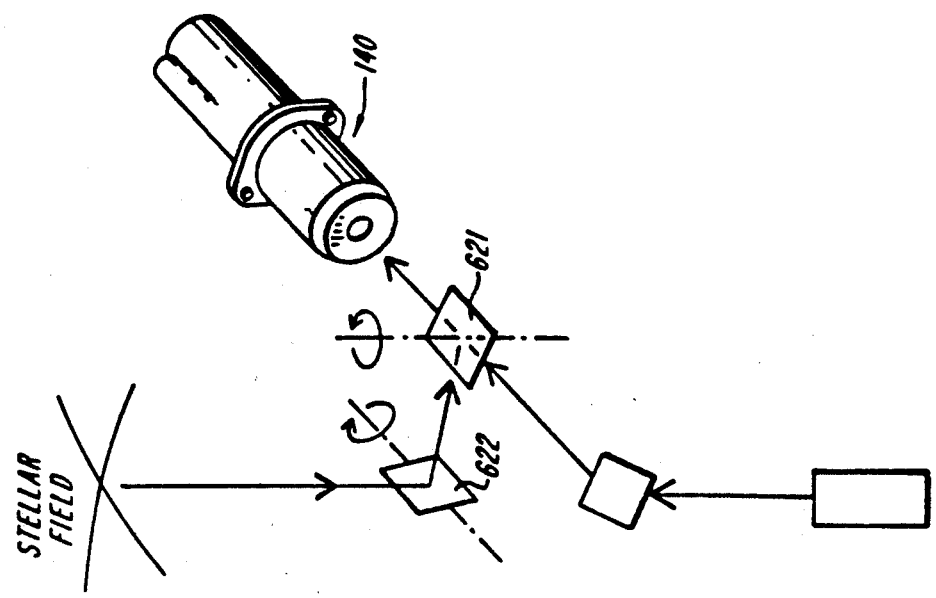

FIGS. 6a and 6b illustrate another embodiment 300 of a laser pointing system according to the invention, with the mirror mechanics, pointing system base member and gyro reference package omitted for clarity of illustration. In this embodiment, the beam steering is performed by two single axis mirrors 621, 622. FIG. 6a illustrates the initial step of self aligning the laser, mirrors and tracker to initialize the gyro reference package. FIG. 6b illustrates the beam path of the laser later aimed at geographic coordinates.

Figure 7:
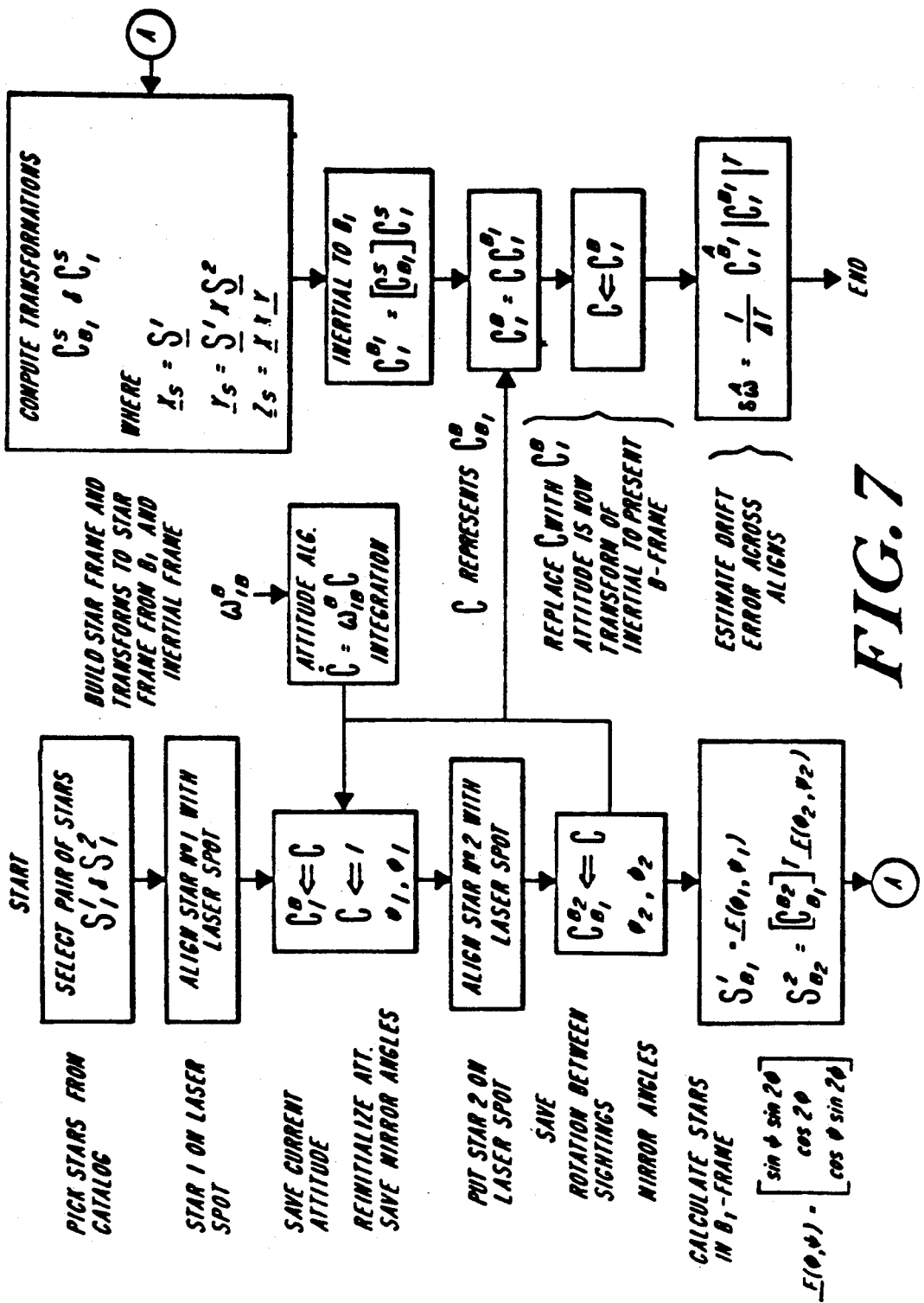
FIG. 7 is a flowchart of laser pointing operations in accordance with the invention.

FIG. 7 is a flowchart of the stellar alignment and mirror aiming software control module for a pointing system as described above.

Figure 8:
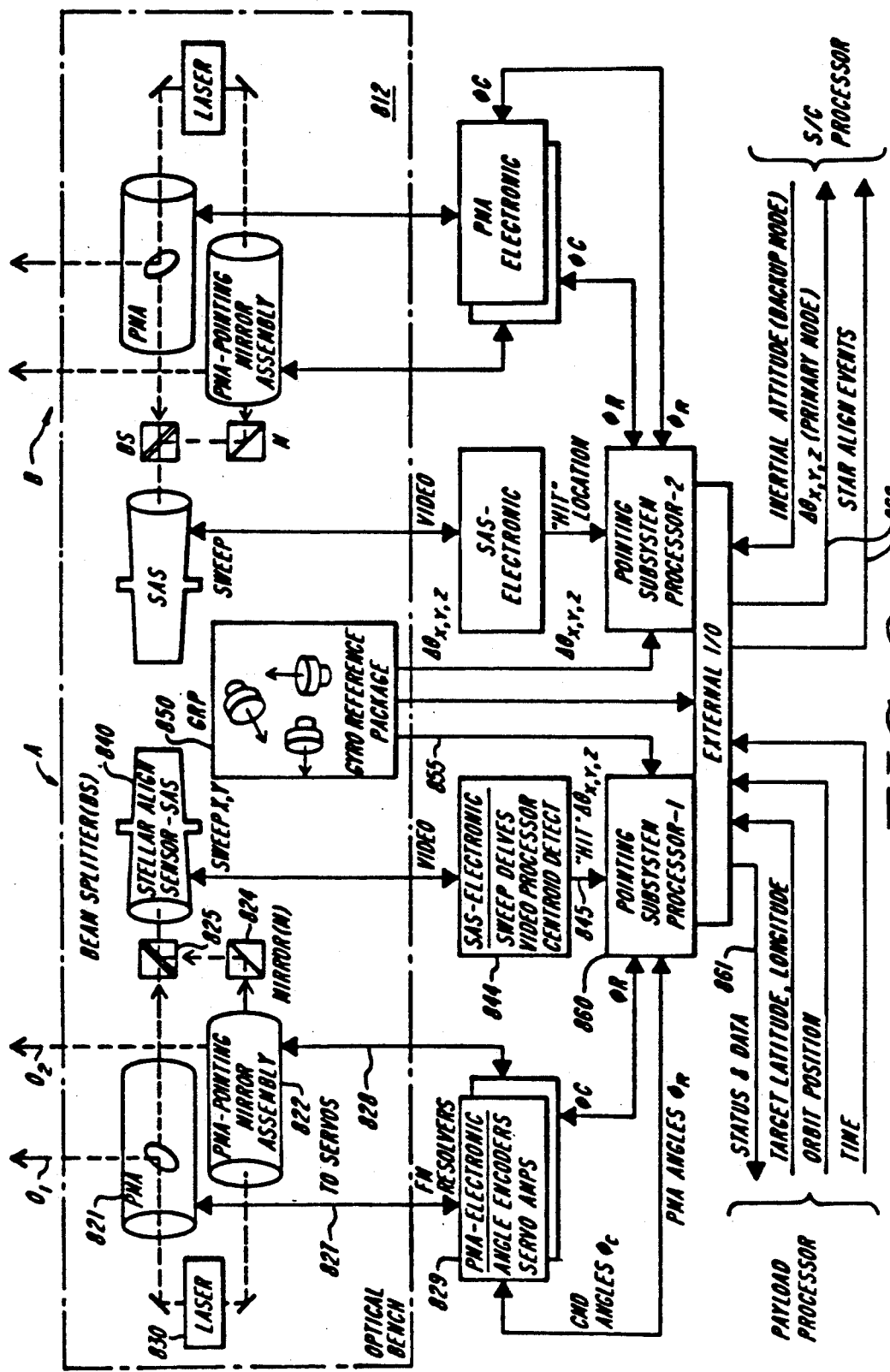
FIG. 8 is a schematic showing the interconnection of different elements of the Pointing systems of FIGS. 2-6.

FIG. 8 illustrates the overall interconnection of elements of a complete laser pointing system and the navigational data computer of a spacecraft, with two separate and identical pointing systems A, B mounted on a common base 812 and sharing a common gyro reference package 850. In each mirror/star tracker subsystem A, B, a pair of X- and Y- steering mirror assemblies 821,822 receive the beam from a laser 830 and reflect the principal portion of the beam along output paths $0_1$, $0_2$ while passing an attenuated tracking portion to a star tracker 840. The tracking beam from pointing mirror assembly 822 is directed, via mirror 824 and beamsplitter 825 to the tracker 840. Beamsplitter 825 also passes the transmitted attentuated beam passing through mirror 821 to the tracker 840. As shown, the signal and control lines 827, 828 connect the resolvers and motor windings of each of the pointing mirror assemblies to a pointing mirror electronics assembly 829 which includes angle encoders and drive amplifiers, for outputting angular mirror position signals and moving the mirrors in response to input mirror angle commands.

A pointing subsystem processor 860 receives the mirror angle position signals and provides calculated command angle signals to the electronics assembly 829 based on its other data inputs. Specifically, the video and synchronization signals of tracker 840 pass to a tracker electronic sensing/video processing module which includes a centroid detector and provides an output along line 845 indicating when the laser and' given alignment star are coincident on the tracker's photosensor array. Also the gyro reference package 850 provides $\Delta\theta_{x,y,z}$ signals along line 855 to continuously update the initial base orientation. The pointing subsystem processor 860 provides an aiming status signal on line 861 to an external I/O port 870 which may, for example, be used to enable a laser modulator to initiate communications once the beam is aimed. Subsystem processor 860 and gyro reference package 850 also provide attitude change data and star alignment data along lines 862 which may be used for the vehicle navigation system.

External data, such as absolute time, vehicle orbit position and the selected target latitude and longitude pass via I/O port 870 from the payload processor, while the initial attitude may be input from the spacecraft navigational processors.

Thus the laser pointing system of the present invention integrates fully with the stellar alignment or gyro reference package requirements of a satellite navigation system, and provides a highly accurate beam steering system with only a few sources of drift all of which are easily monitored and corrected. All long term drift and misalignment of the beam and mirror is corrected by a single operation which aligns a stellar field with the steered laser beam. Further, the alignment step is such that several different laser/steering mirror systems may each be aligned by aiming them into different portions of the sensor array of a single star tracker.

The invention may thus be implemented in a range of systems and architectures, with differently shared or arranged components, and having single or multiple output channels. Accordingly, it is understood that the description of the foregoing embodiments is intended by way of illustration, and the invention is not limited to the particular illustrated embodiments, but encompasses such further modifications and variations as will occur to those skilled in the art.

What is claimed is:

1. A laser pointing system for aiming a collimated laser beam at a desired target, such system comprising
   a partially transmitting mirror element having first and second parallel sides,
   means for providing a star image field on the first side of the mirror element,
   means for directing a collimated laser beam at the second side of the mirror element so that it is partially transmitted as a first beam constituting a minor steering component from the first side of the mirror element and partially reflected as a second beam constituting a primary aimed beam component from the second side of the mirror element, said first beam being parallel to said laser beam,
   stellar alignment means for aligning the first beam with the reflection of a selected star of the star image field, whereby the second beam is aligned with the selected star providing a true stellar orientation of both said mirror element and collimated laser beam, and
   control means for moving the mirror element from said true orientation in accordance with the current position of the system to aim the second beam at a desired target.

2. A laser pointing system according to claim 1, wherein said mirror element and said stellar alignment means are mounted on a common dimensionally stable base, and further comprising gyro reference means mounted on said base for determining changes in orientation of the pointing system, said control means being operative to move the mirror to correct for changes in orientation detected by said gyro reference means.

3. A laser pointing system according to claim 2, further comprising means for sensing physical variations between portions of said base having said mirror and said gyro reference means thereon, and for correcting the position of said mirror in accordance therewith.

4. A laser pointing system according to claim 2, wherein said base is mounted in a space vehicle by a strain-isolating and vibration-isolating mounting assembly.

5. A laser pointing system according to claim 2, wherein the means for directing a laser beam at the second side of the mirror element comprises
   a laser cavity assembly for generating said laser beam,
   an inertial sensor for detecting motion of said laser cavity and producing an indication thereof,
   a correction mirror interposed in an optical path between said laser cavity and said second side, and
   control means responsive to the indication produced by the inertial sensor for effecting a corrective motion of the correction mirror to maintain the laser beam directed along a fixed direction at said second side.

6. A laser pointing system comprising
   a base,
   a laser aiming mirror assembly mounted on the base, a stellar alignment system mounted on the base, said stellar alignment system including means for reflecting a star field and a laser beam from the mirror and means for moving the mirror to superimpose a selected star image of said field and point image of the laser beam on each other and thereby determine an initial orientation of the aiming mirror effective to aim the laser beam, a sensing system mounted on said base, and means for correlating the initial orientation of the aiming mirror with continuing data from said sensing system to aim the laser beam to a desired direction.

* * * * *